June 11, 1968 F. S. NICHOLS ET AL 3,388,211
SEALING BUSHING AND WALL MEMBER FOR ELECTRICAL APPARATUS
AND METHOD OF ASSEMBLING SAME
Filed July 7, 1965
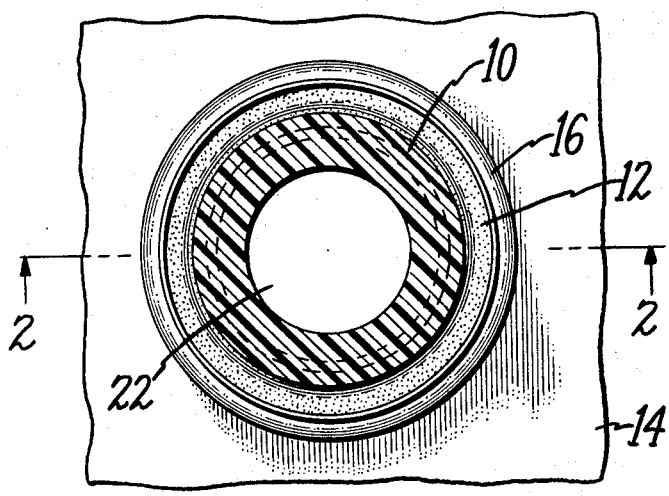
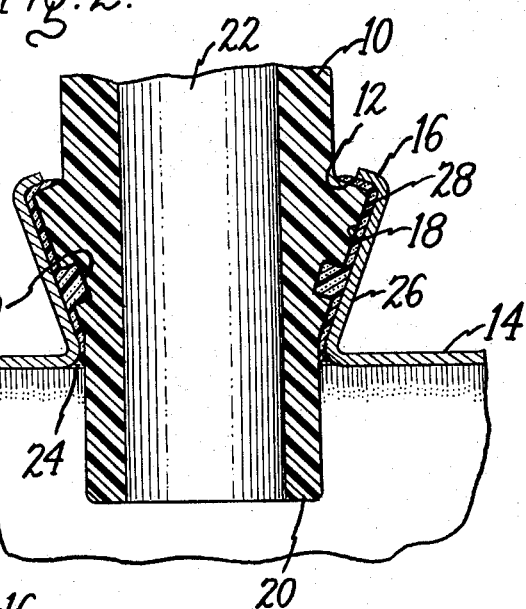
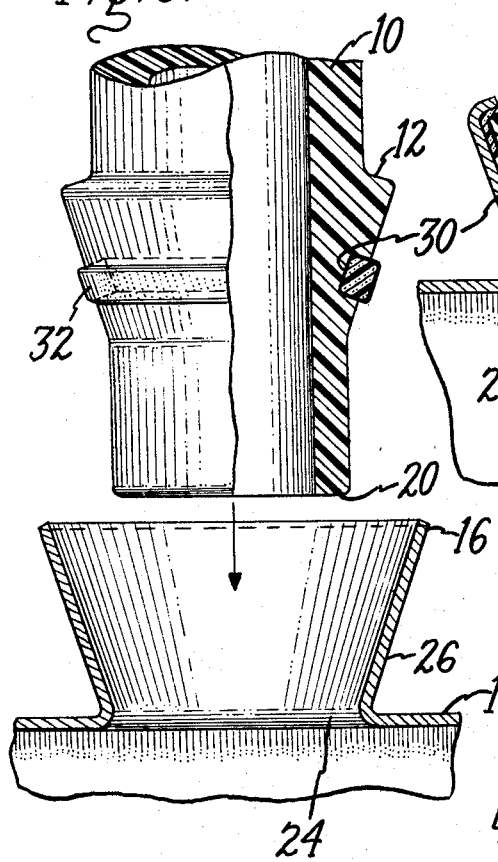
Inventors,
Frank S. Nichols,
Goldner F. Lipsey,
Gordon C. Nonken,
by Francis K. Doyle
Their Attorney.

United States Patent Office 3,388,211
Patented June 11, 1968

3,388,211
SEALING BUSHING AND WALL MEMBER FOR ELECTRICAL APPARATUS AND METHOD OF ASSEMBLING SAME
Frank S. Nichols, Goldner F. Lipsey, and Gordon C. Nonken, Pittsfield, Mass., assignors to General Electric Company, a corporation of New York
Filed July 7, 1965, Ser. No. 470,083
3 Claims. (Cl. 174—152)

This invention relates to bushings for electrical apparatus and more particularly to a sealed bushing and wall member and method of making the same.

As is well known to those skilled in the electrical art, bushings are used to provide a means for bringing an electrical conductor into the enclosure of an electrical apparatus. One function of the bushing is to insulate the electrical conductor from the enclosure of the electrical apparatus. Where the electrical apparatus is enclosed in a sealed enclosure, such as one having a dielectric fluid, the bushing must also provide a sealed entrance to the enclosure to prevent entry of air and moisture and prevent leakage of the dielectric fluid. Many present day bushings are sealed to a wall member of an electrical apparatus by compressing a gasket between the bushing and the wall member. In many instances there has been a tendency for such bushings to leak, due to failure of the gasket material because of mechanical overloading and/or ozone cutting.

Therefore, one object of this invention is to provide a bushing sealed to a wall member of an electrical apparatus with a secure mechanical attachment and a leakproof seal.

One obvious method of achieving this is to cast a plastic bushing directly onto the tank. However, as is well known to those skilled in this art in many types of electrical apparatus such as, for example, distribution transformers, the temperature varies between a high of 150° C. down to a temperature as low as —40° C. As will be understood with such wide ranges of temperatures the differential in coefficients of expansion between the bushing material and the wall member material can cause leakage of the bushings.

Therefore, it is a further object of this invention to provide a method of attaching and sealing a bushing to a wall member which will maintain its seal through temperature changes and which is not effected by mechanical stress.

A further object of this invention is to provide a novel means of mounting and sealing a bushing to a wall member.

In carrying out this invention in one form a wall member is provided having an opening with a conically shaped extending edge. A bushing is provided having a portion thereof formed into a complementary conical surface with an inturned shoulder formed at its largest diameter. The conical edge of the wall member opening is of greater length than the conical surface of the bushing such that when the complementary portions are in mating engagement the upper portion of the conical edge may be spun over the shoulder of the conical surface of the bushing thereby securely attaching the bushing to the wall member. An elastomeric material is placed between the mating portions of the conical surface and the conical edge which, when cured, forms a flexible, leak-proof bond to both the conical surface of the bushing and the conical edge of the wall member opening.

The invention which is sought to be protected will be particularly pointed out and distinctly claimed in the claims appended herto. However, it is believed that this invention and the manner in which its various objects and advantages are obtained, as well as other objects and advantages thereof, will be better understood by reference to the following detailed description of a preferred embodiment thereof, particularly when considered in the light of the accompanying drawing, in which:

FIGURE 1 is a top view, partially in section, of a bushing sealed to a wall member according to one form of this invention;

FIGURE 2 is a sectional view taken on the line 2—2 of FIG. 1; and

FIGURE 3 is an exploded plan view partially in section showing a preferred method of assembling the bushing and wall member according to this invention.

Reference will now be made to the drawing, in which like numerals will be used to indicate like parts throughout the various views thereof. Referring first to FIG. 1, there is shown a bushing 10 having a shoulder 12 which is secured to a wall member 14 by the spun over portion 16 of the wall member 14. FIGURE 2 shows that the bushing 10 is provided with a conical surface 18 which forms the inturned shoulder 12 at the largest diameter of the conical surface 18. As is apparent from FIG. 2 and FIG. 3, the conical surface 18 of bushing 10 is formed near the lower end 20 of bushing 10. A bore 22 is provided through bushing 10 to receive an electrical conductor (not shown). As will be understood the electrical conductor, for example a high voltage lead, may be sealed within the bore 22 in a manner well known to those skilled in the art. For example, bushing 10 could be a molded plastic bushing and the electrical conductor could be molded directly into the bushing. Other means of bringing a lead or conductor through bore 22 and sealing one or both ends of bore 22 are well known and could be used as desired.

The wall member 14 may form a portion of the enclosure of an electrical apparatus or it may be a separate wall member which may be secured to the enclosure of an electrical apparatus by any convenient means such as, for example, by welding. As shown, wall member 14 is provided with an opening 24, the edge of opening 24 being formed into a conical section 26, complementary to the conical surface 18. As can be seen the conical edge 26 is of greater length than the conical surface 18. Thus when the conical surface 18 and the conical edge 26 are in mating engagement, as shown in FIG. 2, the upper portion 16 of conical edge 26 may be spun or rolled over the shoulder 12 in the manner clearly shown in FIG. 2. As will be apparent, the engagement of the spun end 16 with shoulder 12 will provide a secure mechanical attachment of the bushing 10 to the wall member 14. Due to the mating of the conical surface 18 and conical edge 26, the bushing 10 will not be able to extend further through the opening 24 in wall member 14. Thus the bushing 10 is securely fastened within the opening 24 of wall member 14.

To provide the desired sealing of bushing 10 to the wall member 14 a coating 28 of an uncured elastomer is provided on the conical surface 18 of bushing 10. When the elastomer coating 28 is cured it will firmly bond to the conical surface 18 and the conical edge 26. As will be understood the cured elastomer coating 28 will provide a flexible bond which will readily follow the movement of the conical surface 18 and the conical edge 26 through wide excursions of temperature. Many simples have been made using a bushing of epoxy, a metal wall member and a polyacrylic elastomer in the manner specified in this this invention. These samples have been repeatedly cycled through a temperature range from —40° C. to 150° C. without any leakage problems.

In the preferred embodiment shown, the uncured elastomer is placed in a groove 30 formed in the conical surface 18. The uncured elastomer is in the form of a band 32 as shown in FIG. 3. This band 32 is of sufficient thickness to completely fill groove 30 and to extend beyond the conical surface 18 as shown in FIG. 3. As the conical surface 18 and conical edge 26 are brought into mating engagement an end 16 is spun over the shoulder 12, the band 32 of uncured elastomer is squeezed between the mating conical surface 18 and conical edge 26 providing a coating of elastomer 28 on the conical surface 18 as is shown in FIG. 2. Of course, it will be understood that a coating of elastomer such as 28 could be placed on the conical surface 18 prior to engagement of the mating portion if desired.

As will be understood prior to coating of the surface 18 with the elastomeric material or prior to placing elastomeric material into the groove 32 and the engagement of the mating surface and edge, a suitable primer will be applied to the surfaces to which it is desired to bond the elastomer. The particular primer used will depend upon the character of the elastomeric material used. When using polyacrylic material it is preferred to use a primer such as is sold by the Dayton Chemical Co. under the trade name Thixon X0-1099. However, it will be understood that other types of elastomeric material may be used and a suitable primer may be utilized to provide the desired bonding.

As will be apparent from the above description a bushing member is mechanically connected to a wall member and a leak-proof seal is provided therein by the method of this invention. Essentially this method requires that a conical surface be provided on a portion of the bushing and that a conical edge be provided for the opening in the wall member. The conical surface and the conical edge must be complementary and the conical edge must be of greater length than the conical surface of the bushing. An elastomeric material is coated on the conical surface and then the conical surface and the conical edge are brought into mating engagement. The portion of the conical edge which extends beyond the conical surface is spun over to engage the shoulder which is formed on the largest diameter of the conical surface. The elastomeric material is then cured proving a firm, flexible leak-proof seal between the bushing member and the wall member. Of course, as will be understood while in the drawing the bushing device is sectioned to indicate a plastic type bushing, it will be understood that other types of bushings, such as porcelain, may be used as desired.

While there has been shown and described the present preferred embodiment of this invention it will be apparent to those skilled in the art that various changes may be made in the details thereof without departing from the spirit and scope of the invention as set forth in the appended claims.

What is claimed as new and which it is desired to secure by Letters Patent of the United States is:

1. A method of attaching and sealing an insulated bushing for an electrical apparatus to a wall member comprising:
   (A) forming a portion of said bushing into a conical surface having an inturned shoulder formed at the largest diameter of the conical surface,
   (B) providing an opening in said wall member, the edge of said opening being formed into a conical shape complementary to said conical surface of said bushing,
   (1) said conical edge being greater in length than said conical surface,
   (C) coating said conical surface with an uncured elastomer,
   (D) inserting said bushing into said opening with said conical surface and said conical edge mating and a portion of said conical edge extending beyond said shoulder,
   (E) spinning said extended portion of said conical edge over said shoulder forming a secure mechanical attachment,
   (F) and curing said elastomer to form a sealed, flexible bond to said conical surface and said conical edge.

2. A method of attaching and sealing an insulating bushing for an electrical apparatus to a wall member comprising:
   (A) forming a portion of said bushing into a conical surface having an inturned shoulder at the largest diameter of said conical surface,
   (B) forming a groove in said conical surface,
   (C) applying a band of uncured elastomer to said groove, said elastomer band extending beyond said conical surface and completely filling said groove,
   (D) forming an opening in said wall member, the edge of said opening being of conical shape complementary to said conical surface and of greater length than said conical surface,
   (E) inserting said bushing into said opening with said conical surface mating with said conical shape with a portion of the largest diameter of said conical edge extending beyond said shoulder,
   (F) spinning said extended portion of said conical edge over said shoulder to form a secure mechanical attachment,
   (G) and curing said elastomer to form a sealed flexible bond to said conical surface and said conical edge.

3. A sealed electrically insulating bushing and wall member for electrical apparatus comprising:
   (A) an opening in said wall member having a conical edge,
   (B) a conical surface on said bushing having an inturned shoulder at its largest diameter,
      (1) said conical surface being provided with a groove,
   (C) said conical edge and said conical surface being in mating engagement with a portion of said conical edge spun over said shoulder,
   (D) and a layer of cured elastomer between said mating conical surface and said conical edge bonded to said conical surface and said conical edge,
      (1) said cured elastomer completely filling said groove.

References Cited

UNITED STATES PATENTS

| 2,535,837 | 12/1950 | Coyle | 222—566 |
| 3,011,013 | 11/1961 | Sandkuist | 174—152 |
| 2,113,405 | 4/1938 | Junken. | |

FOREIGN PATENTS

| 609,881 | 5/1926 | France. |
| 567,809 | 4/1945 | Great Britain. |

LARAMIE E. ASKIN, *Primary Examiner.*